May 8, 1962  I. W. LICHTENFELS  3,034,031
ELECTRIC RAILWAY CONTROL POSITIONING SYSTEM
Filed June 29, 1956  4 Sheets-Sheet 2

Inventor:
Ira W. Lichtenfels,
by David P. Ogden
His Attorney.

May 8, 1962     I. W. LICHTENFELS     3,034,031
ELECTRIC RAILWAY CONTROL POSITIONING SYSTEM
Filed June 29, 1956     4 Sheets-Sheet 3

Fig. 7

Inventor:
Ira W. Lichtenfels,
by David P. Ogden
His Attorney.

Fig. 9.

Inventor:
Ira W. Lichtenfels,
by David P. Ogden
His Attorney.

United States Patent Office 3,034,031
Patented May 8, 1962

3,034,031
ELECTRIC RAILWAY CONTROL POSITIONING SYSTEM
Ira W. Lichtenfels, Erie, Pa., assignor to General Electric Company, a corporation of New York
Filed June 29, 1956, Ser. No. 594,882
9 Claims. (Cl. 318—274)

My invention relates to a control system for high speed electric railway equipment and, more particularly, for positioning sequentially operated contactors to provide fast and smooth transition between power application, coasting and dynamic braking of such equipment.

For many years the electric railway industry depended primarily on mechanical brakes to stop a rail vehicle. However, as the maximum speed of the vehicle is increased from 40 miles an hour to over 75 miles an hour, it becomes increasingly difficult to provide friction brakes which will adequately control the deceleration of the vehicle. One of the difficulties in attempting to slow the high speed vehicles by friction brakes is caused by heating of the braking surfaces. Such excessive heating will not only cause excessive wear of the friction surfaces, but also will tend to melt these surfaces or soften them to lubricate the sliding surfaces and thus decrease the braking torque.

However, with the use of dynamic braking as the primary brake, the braking torque is not proportional to the speed but, instead, is proportional to the load current which may be readily controlled. Even more important is the fact that a traction motor being driven as a generator during dynamic braking may be used in braking at a high speed since any heating of the motor is directly proportional to the current, not the speed of the motor. Thus, dynamic braking provides maximum braking effort from a traction motor at any time the motor is turning over at a speed sufficient to develop the maximum allowable current. This is true regardless of whether the vehicle is going 2 miles an hour, 40 miles an hour or 80 miles an hour.

A simple and inexpensive controller positioning system allowing immediate transition from power application to dynamic braking has been sought but has not been developed to an extent where it was practicable to use the dynamic brake as primary brake for stopping the vehicle. Since the amount of resistance in the motor circuit during low speed acceleration is maximum while the amount used during high speed braking is maximum, it has proved to be an unusually difficult problem to arrange the circuit components and current limiting resistors of an accelerating circuit of traction equipment of an electric railway so that at all times it is feasible to change the current connections to provide for acceleration or dynamic braking regardless of the speed of the vehicle. The supposedly simple solution is severely complicated by the fact that all during the ordinary acceleration cycle, load impedance is being removed from the circuit as the traction motors accelerate and because of the limited space available this same resistance must be added during high speed dynamic braking. For this reason, past attempts to provide dynamic braking have required the resistance shunt controller to be in certain positions before dynamic brakes could be applied. This arrangement has made prior dynamic braking systems unacceptable as a high speed primary brake.

Another unacceptable solution has been an attempt to provide a control system using dynamic braking, where, at any time the operator decides to apply dynamic braking, the resistor controller is run to full resistance and from there backed off to the minimum allowable resistance to control the dynamic braking current. This added cycling not only causes considerable additional wear on the control equipment and the switching devices, but also requires additional time before braking is actually effective. Such additional time is always objected to by the operators.

Therefore, an object of my invention is to provide a simple and reliable control system that is always properly positioned for power or dynamic braking.

Another object of my invention is to provide a reliable, automatic electric control system suitable for railway vehicle operation wherein the control may be switched to power, coast or brake regardless of its position or the train speed.

A further object of this invention is to provide a dynamic braking control system fully operative at any desired speed between one and one-half miles per hour and the maximum speed of the electric railway vehicle.

In carrying out my invention in one form, I use a circuit controller to control the connection of the power elements within the circuit and a resistance controller to control the percentage of the resistance elements in the circuit. Initially, traction motors or pairs of traction motors are serially connected with a maximum acceleration current limiting resistance. The resistors are selectively shunted from the circuit, and the field windings of the serially connected traction motors partially shunted to further accelerate the vehicles. By a closed bridge transition arrangement, the series connection is changed to a parallel connection with two branches each having current limiting resistance therein. During the transition step, the field shunting arrangement is removed so that full field current excites the traction motors in the parallel branches. Further acceleration is accomplished by removal of the resistance from the parallel circuit branches and maximum speed is attained by again shunting the field windings of the traction motors. During any position within the acceleration cycle, the operator may connect for coasting or dynamic braking, which reverses the controllers to run down a few notches to establish the desired braking.

While the specification concludes with claims particularly pointing out and distinctly claiming the subject matter which I regard as my invention, it is believed that the invention will be better understood from the following description taken in connection with the accompanying drawings, in which:

Figure 1:
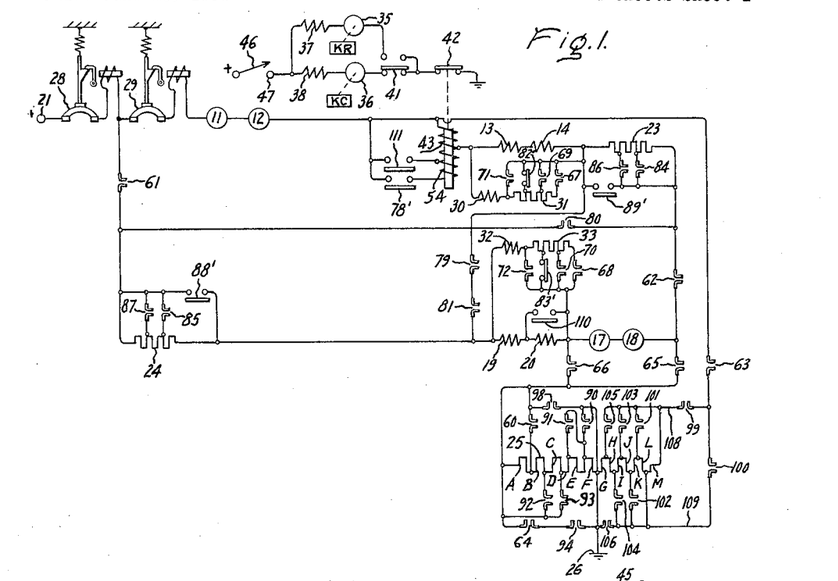
FIG. 1 is a diagrammatic illustration of one embodiment of my invention.
Figure 2:
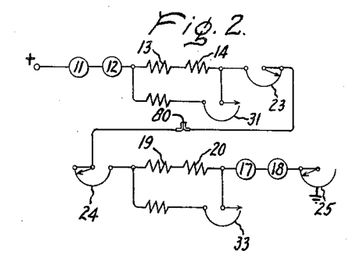
FIG. 2 is a simplified circuit diagram showing a series connection arrangement of my invention.

Referring now to the drawings, I have shown in FIG. 1 the traction motors 11 and 12 connected in series with their respective field windings 13 and 14. Similarly, the traction motors 17 and 18 are connected in series with their respective field windings 19 and 20. I prefer that the field windings 13, 14, 19 and 20 are reversibly connected in the circuit by a synchronized reversing switch (not shown) allowing all of the traction motors to promote tractive effort in either direction.

It is well known that the effective impedance of a series motor is proportional to its speed. Usually, rapid transit rail vehicles are energized from a relatively constant voltage, by means of a pantograph or other sliding contact illustrated schematically as a terminal 21. Therefore, in order to limit the current flow in the traction motors when the speed of the motors is not sufficient to provide an electromotive force nearly equal to the supply voltage, I have inserted in the circuit with the traction motors 11 and 12 a load resistor 23, and in circuit with the traction motors 17 and 18 a load resistor 24. A main load resistor 25 has its sections, A, B, C, D, E, F connectable between the motors and a ground terminal 26. During acceleration each of the load resistors 23, 24 and 25 may be shunted from the circuit in a plurality of steps or notches to increase the load current in the motors as the electromotive force increases with an increase in the traction motor speed.

I prefer to protect the entire traction motor circuit from damaging overcurrents by connecting some well known type of safety switch or circuit breaker 28 between the power terminal 21 and the motor circuit. Of course, additional or specialized overcurrent protection devices may be required in some applications. In order to protect the traction motors during coasting and braking, I have connected one of these overcurrent devices 29 in circuit with the motors 11 and 12.

Further regulation of the effective impedance of the traction motors during dynamic braking and further control of the current during motoring is obtained by shunting each of the field windings 13, 14, 19 and 20. An inductance 30 and a variable resistor 31 are connectable across the field windings 13 and 14. The use of an inductance 30 is primarily to provide an inductive characteristic in the field winding shunt so that any transient voltages in the power supply will not change the ratio of the shunt current to the current in the field windings. A similar inductance 32 and resistor 33 are connectable in circuit with the field windings 19 and 20 to similarly reduce the excitation of the traction motors 17 and 18.

It should be understood that the usual practice in this art is to have a plurality of contactors for shunting each of the variable resistors 23, 24, 25, 31 and 33. These contactors are operable in a predetermined sequence to reduce the impedance of the circuit in a predetermined manner, such as geometric progression. However, such switching arrangements are well known in the art and the details are not a part of this invention. A more efficient switching arrangement is shown and described in detail in the Patent 2,131,588 issued to W. T. Gray on September 27, 1938, and assigned to the assignee of the present invention. Of course, it should be understood that the particular characteristics of the traction motors, resistance of the resistors and the electrical location of the resistor taps will to some extent control the particular sequence which is most advantageous as well as the number of useful steps available for accelerating and dynamic braking.

In FIGS. 2, 3, 4 and 5, I have shown the load resistors 31 and 33 as variable rheostats having an "off" position when the resistance is open and the field windings of the traction motors are not shunted. Similarly, I have shown the load resistors 23, 24 and 25 as variable rheostats having no open position. The important thing to remember is that each of the impedances 23, 24, 25, 31 and 33 may be shunted from the circuit in a plurality of steps or notches, as the train is accelerated when motoring or decelerated when braking.

In FIG. 1, I have also shown a simple arrangement for automatically driving controllers to regulate the impedance of the resistors and the circuit connections of this control system. A resistance controller KR is drivably connected to a controller motor 35 and a circuit controller KC is drivably connected to a controller motor 36. I prefer to have the controller motors reversible so that the train may be accelerated or decelerated from any notch. In one particular arrangement used, this is accomplished by providing each of the motors with a pair of field windings 37, 38 (FIGS. 1 and 8), 39 and 40 (FIG. 8) with one of each pair providing a flux to drive the controller motors in one direction and the other of each pair connected to drive the controller motors in the opposite direction.

In order to determine which of the controller motors 35 or 36 is energized, a double throw contact 41 selectively connects one of the motors to ground. A serially connected contact 42 is opened by a calibration relay 43 to prevent operation of the controller motors 35 and 36 at any time the current in the motor circuit, as sensed by the relay 43, is greater than the predetermined amount. Such a calibration relay is well known in the art and a suitable one is described in detail in my co-pending application, Serial Number 490,561, filed February 25, 1955, now Patent No. 2,844,780 and assigned to the assignee of the present application.

Figure 7:
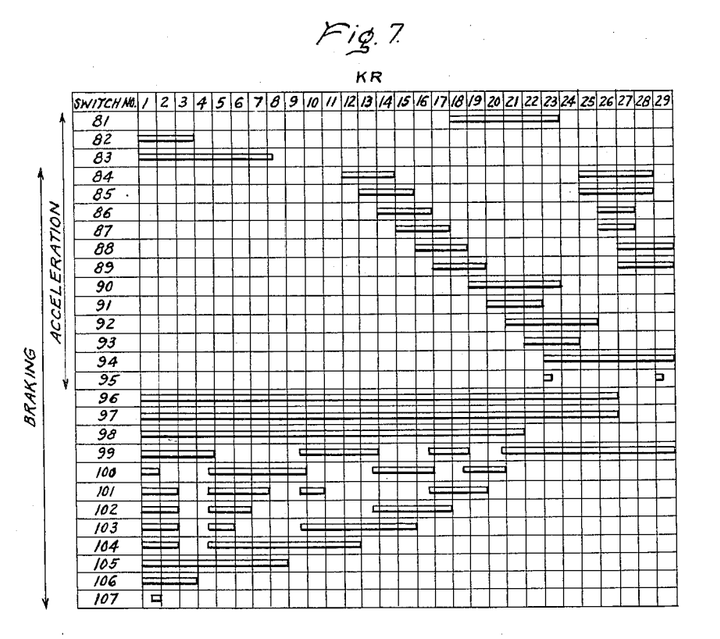
FIG. 7 is a schematic layout of the resistance controller connections.
Figure 8:
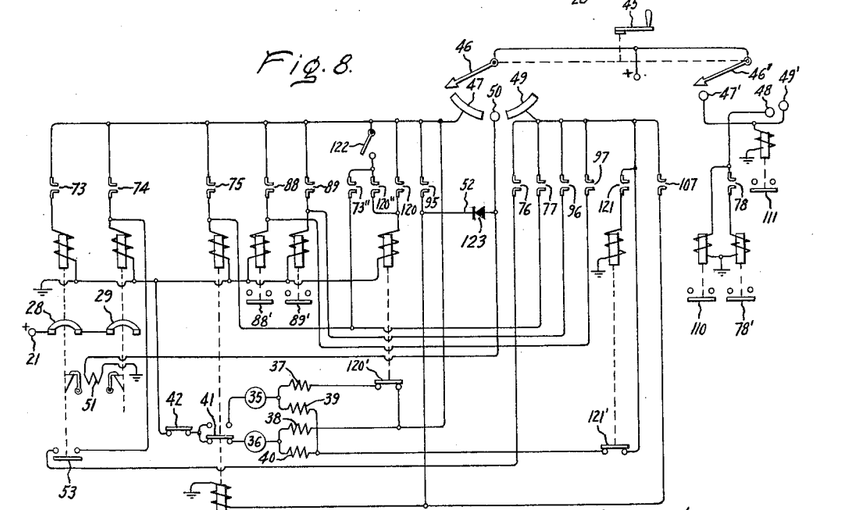
FIG. 8 is a circuit diagram showing interlocking connections.

In order to simplify the discussion and the circuit diagrams, I have removed the reversing means, interlocking connections and relays from FIG. 1 and shown them separately in FIG. 8. Thus, contactors 82, 83, etc. (FIGS. 6, 7 and 8) effect the closing of contacts 82', 83', etc. (FIGS. 1 and 8).

*Acceleration*

When the engineman wishes to start the train from a standstill, he moves a selector control 45 to connect a selector switch 46 to a power contact 47 (FIGS. 1 and 8) to energize the acceleration circuit including the controller motor 36. With the contact 47 energized, the controller motor 36 drives the circuit controller KC in a forward direction to position 9.

The contactors 60–80, 120, 121, 120" and 73" (FIG. 6) operated by the circuit controller KC in the 14 notches used, control the motor circuit connections to provide a series acceleration connection, parallel acceleration connections, deceleration connections, and connect the controller motor 35 to be energized at the proper times.

In the first acceleration notch (9), the contactor 65 of the controller KC is shunted to connect the motor circuit to the grounding resistor 25. In order to connect the traction motors to the terminal 21, the switches 73 and 74 (FIGS. 6 and 8) are momentarily energized in position 9 to reset the protective devices 28 and 29 respectively. The closed contactors 64 and 79 are interlocking contactors which allow shunting of the main load resistors when contactors 94 and 81 respectively are closed by the controller KR. These connections result in the simplified circuit shown in FIG. 2. In notch 9, the circuit controller KC also momentarily energizes the contactor 75 to move the contact 41 to energize the resistance controller motor 35.

The resistance controller KR (FIG. 7) is similar to the circuit controller KC except that it has more contactors (81–107) and more notches (29). The contactors are designed to control sequentially the shunting of the variable resistors 23, 24 and 25. During acceleration, the dynamic braking contactors 99 through 107 are not utilized because the interlocking contactor 63 is not closed.

When the controller KR is in notch 1, the contactors 82 and 83 are closed to energize respectively relays which close contacts 82' and 83' to shunt the field windings of the traction motors (FIG. 1) to 39 percent of rated capacity. As the resistance shunt controller KR runs through notch 4, the contactor 82 is opened, disconnecting the shunt from the field windings 13 and 14 to apply full field to the traction motors 11 and 12. As the resistance controller KR runs through notch 8, the contactor 83 is opened to apply full field to the traction motors 17 and 18.

In notch 12, a KR contactor 84 is closed to shunt a portion of the load resistor 23. In notch 13 a KR contactor 85 is closed to shunt a portion of the load resistor 24. In notch 14, a contactor 86 is closed to shunt a second portion of the resistor 23. Also, the closing of the contactor 86 shunts the contactor 84 allowing it to be opened with no current therein whereby no arcing is likely to occur. As the resistance shunt controller KR proceeds through position 23, the resistors 23, 24 and 25 are selectively shunted from the circuit.

Usually this selected shunting of the resistors from the circuit is a geometric progression shunting a fairly large section of resistance during the first step and shunting a smaller section of resistance in each succeeding step. In this way, the traction motor current and the rate of acceleration of the train is maintained at a nearly constant level. The reason for this is more apparent when one considers the decreasing voltage across the resistors as the motors increase in speed and the fact that the smaller sections removed from the smaller amount of resistance remaining will still provide a similar percent increase in the voltage across the motors.

However, if the resistance shunt controller were allowed to operate at its maximum speed, it would quickly remove all of the resistance of the circuit and thus increase the current more rapidly than the traction motors could accelerate the train. This might damage the traction motors, slip the wheels or break the gearing between the motors and the wheels.

In order to prevent uncontrolled current in the motors, the current sensing relay 43 is connected in circuit with the traction motors 11 and 12 to be energized by a maximum predetermined current to open the contacts 42 and stop the controller motor 35. Assuming the desired current was reached in KR notch 13, the controller motor 35 would be stopped there until the traction motors accelerated enough to increase the back electromotive force and a predetermined minimum current was established. At this minimum current, the relay 43 will no longer be energized to open the contactor 42 and the controller KR is driven to the next notch where the impedance is reduced further and the current again increases to energize the calibration relay 43. Thus, the controller KR selectively and intermittently shunts impedance from the traction motor circuit.

In notch 23, the resistance controller contactor 95 is momentarily closed to reverse the switch 41 to energize the circuit controller motor 36. When the contacts 42 again close, the circuit controller KC will operate to move from notch 9 to notch 13. In notches 10, 11 and 12, maximum acceleration in series operation is obtained by selectively shunting the field windings of the traction motors to 75 percent, 50 percent and 33 percent by closing contactors 67, 68, 69, 70 and 71 and 72, respectively.

Figure 3:
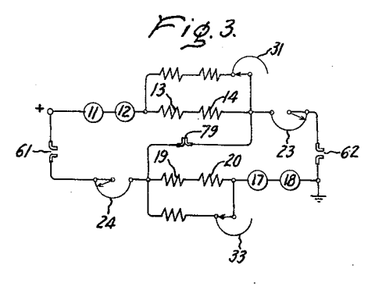
FIG. 3 is a simplified diagram showing the transition connections.
Figure 4:
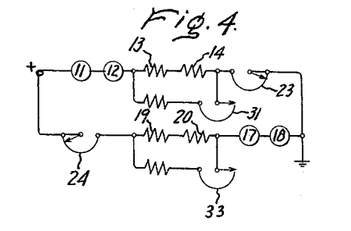
FIG. 4 is a simplified circuit diagram showing the parallel circuit connections of my invention.

In notch 13, a closed bridge transition is accomplished to connect the motors in parallel circuits. The transition connections are shown in FIG. 3 where the resistors 23 and 24 are inserted in the circuit by the closing of contactors 61 and 62 and then the opening of the contactor 79. This acceleration cycle and particularly the closed bridge transition are explained in more detail in my copending application, Serial Number 594,875, filed June 29, 1956, now Patent No. 2,913,650, and assigned to the assignee of this application. In the transition notch (13) of the controller KC, the contactors 67–72 are opened to remove the shunt from the field windings to provide the parallel circuits shown in FIG. 4.

Also, in notch 13, the contactor 75 is again momentarily closed to energize the resistance controller KR. In the next few notches of the resistance controller, the resistors 23 and 24 are selectively shunted from the circuit. To accomplish this, the resistance controller KR intermittently runs to notch 29. In this notch, the contactor 95 is closed again momentarily to energize the circuit controller KC to run to notch 14 where the contactors 71 and 72 close to shunt the field windings of the traction motors to 33 percent. In notch 14, the circuit controller closes contactor 120 to open an interlock contact 120' to prevent further operation of the controller motors in the forward direction.

Thus, it is readily apparent that I have developed a system operating a contactor arrangement for automatically accelerating traction motors of railway equipment from standstill to full speed. Depending somewhat on the characteristics of the motors and on the gearing connecting the motors to the drive wheels as well as the size of the wheels, this maximum speed may be limited to any value compatible with rail conditions and the time schedules of the railroad. In one particular equipment, this control system has been used at the maximum allowable speed of approximately 80 miles per hour.

*Coasting*

When the engineman no longer desires to accelerate his train, he moves the selector switch 46 from the power connection 47 as shown in FIG. 8 to energize a coast connection 48 and a deceleration connection 49. In doing so, he momentarily energizes a contact 50 (FIG. 8) to energize a coil 51 which unlatches the overcurrent devices 28 and 29 to disconnect the motor circuit from the power terminal 21 and open the motor circuit. The contact 50 also energizes a wire 52 in parallel with contactor 95, to insure the proper positioning of the contact 41 for energization of the circuit controller motor 36. The unidirectional conducting device 123 is included in wire 52 and so poled as to prevent energization of coil 51 by the closing of contacts 95 and 107. If so desired, a relay-contactor arrangement could be inserted in the line between contact 50 and coil 51 to accomplish the same purpose as unidirectional conducting device 123.

In both coasting and braking, the windings 39 and 40 of the controllers are connected to the power supply by the deceleration connection 49 to reverse the controller motors 35 and 36.

During coasting the circuit controller KC is energized to run down through notch 8 where it momentarily energizes the contactor 76 to again close the overcurrent device 29 to protect the motor circuit during coasting or dynamic braking. I prefer that the energization of the device 29 be dependent on the proper opening of the overcurrent device 28. Therefore, the wire from the contactor 76 to the reset coil of the overcurrent device 29 has serially connected therein a contact 53 which is only shunted when the overcurrent device 28 is open.

Figure 5:
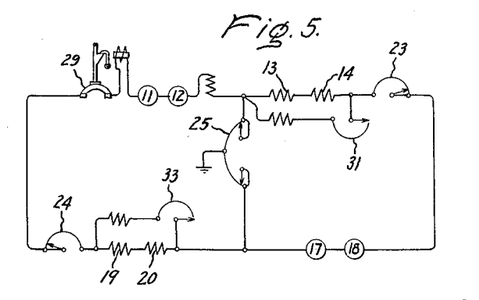
FIG. 5 is a circuit diagram showing a dynamic braking connection according to my invention.

In notch 8, the contactors 71 and 72 are closed to shunt the field windings of the traction motors. The circuit controller KC then runs to notch 7 to connect the braking resistor 25 in the circuit as shown in FIG. 5 by closing contactors 60, 61, 62, 63 and 66. It should be noted from FIG. 5 that a balanced loading of the traction motors is obtained by cross energization of the motor field windings. Thus, each pair of motors controls the voltage of the other pair.

During coasting, a contactor 78 (FIGS. 6 and 8) is shunted to close a contact 78' which energizes a recalibration coil 54 to prevent operation of the controllers KC and KR at a current substantially less than the allowable acceleration current. This limits the traction motor coasting current to a much smaller value which will not of itself cause dynamic braking. If the current in the motor circuit is less than this predetermined coasting value, the relay contact 42 will remain closed and the circuit controller will run down through notches 6, 5, 4 and 3. In order to insure the desired value of field current in each notch, I prefer to momentarily remove the field winding shunt between each shunting step. It may be readily seen from FIG. 6 that contactors 69, 70, 71 and 72 are each open before contactors 67, 68, 69 and 70 respectively are closed. This traction motor field forcing is explained in detail in my United States Letters Patent 2,669,685 issued February 16, 1954, and assigned to the assignee of this application.

In order to maintain proper positioning of the resistance controller KR during coasting, a contact 110 (FIGS. 1 and 8) is closed to shunt the portion of the field windings of at least one of the traction motors. With the cross energization of the traction motor field windings, this will reduce the voltage of the entire system and allow the coasting operation to position the controller between the minimum acceleration and the minimum braking positions shown as the dotted curve HI, FIG. 9.

In notch 2, the contactor 77 is closed momentarily to energize the resistance controller KR. As the speed of the vehicle decreases, the traction motors, driven as generators with their fields partially shunted, provide less than a predetermined current necessary to maintain the recalibrated calibration relay 43 energized and the braking resistors will be shunted intermittently from the circuit by the resistance controller KR.

In coasting, the resistance controller KR will run from notch 29 to notch 28 to close the contactors 84 and 85 (FIG. 1) and partially shunt the current limiting resistors 23 and 24, then to notch 27 where resistance contactors 86 and 87 (FIG. 1) are closed to further shunt these load resistors. In notch 26, contactors 96 and 97 (FIG. 8) are closed to permanently shunt the resistors 23 and 24 from the circuit during the remainder of coasting or braking.

Figure 9:
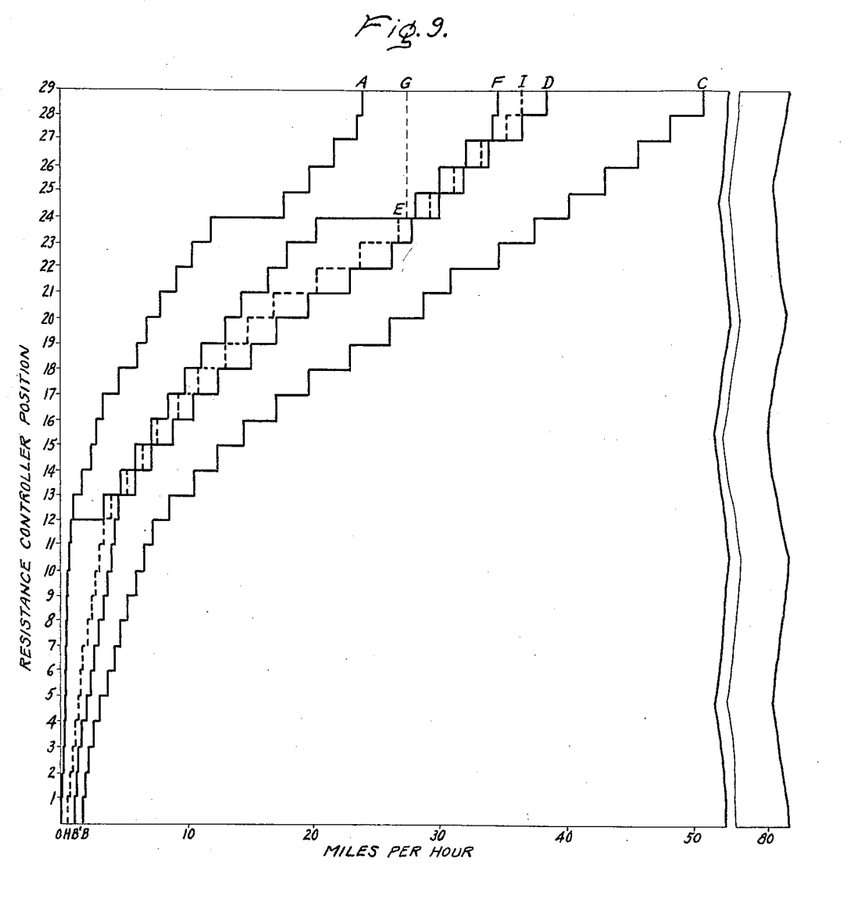
FIG. 9 is a graph of the train speed versus the resistance controller position.

It may be seen from FIG. 9 that the vehicle speed will drop to less than 38 miles per hour in this notch. With the high speed operation contemplated, it is doubtful that the operator would care to coast at a slower speed. Even if he should desire to coast at slower speeds, the operation of the components is the same as that during dynamic braking discussed below with the exception that in coasting at least one of the field windings is shunted and the contactor 78 is closed to recalibrate the relay 43 to a much lower value of current than is required for dynamic braking.

Dynamic Braking

When dynamic braking is desired, the operator moves the selector 46 counterclockwise (FIG. 8) to open contact 48. Braking may be initiated from either coasting or power. From coasting the only effect is to open the contacts 78 and 110. From the power connection contact 50 is again momentarily energized to energize the unlatching coil 51 and energize the circuit controller motor 36. Except for the higher traction motor current necessary to energize the calibration relay 43, the dynamic braking operation (FIG. 5) is the same as that of coasting. That is to say, the circuit controller KC is driven toward position 2 and then the resistance controller KR is driven toward position 1. The notching steps supra to reach position 25 are the same as in coasting.

In notch 25, the contactor 92 is closed to partially shunt the impedance of the resistor 25 by placing sections A and B in parallel. In notch 24, contactor 93 is closed to shunt resistance section C. In notch 23, contactor 90 is closed to shunt resistance section F, and in notch 22, contactor 91 is closed to shunt resistance section E. In notch 21, contactor 98 is closed to shunt resistance sections A, B, C, D, E and F.

In notches 20 through 1, the contactors 99 through 106 are selectively closed to shunt the resistor sections G, H, I, J, K, L and M from the circuit in the predetermined arrangement. This arrangement is explained in detail in the co-pending application, serial number 469,184, filed November 16, 1954, by Charles G. Moon and myself, and assigned to the assignee of the present application.

Briefly, the system is operative only during deceleration to shunt sections G, H, I, J, K, L and M as follows: In notch 20, one section (M) is shunted by the closing of contactor 100, and the shunted contactor 99 is opened. In notch 19, contactor 101 is closed to connect sections L and M in parallel. In notch 18, contactor 99 is closed to shunt sections L and M and the shunted contactor 100 is opened. In notch 17, contactor 102 is closed to connect sections K, L and M in parallel. As is seen from the shunting progression shown in FIG. 7, this operation continues until all of the sections G, H, I, J, K, L and M are connected in parallel in notch 2. In notch 1, they are all shunted from the circuit by the closing of contactor 100. This arrangement utilizing the double bus bars 108 and 109 allows the selective placing of the shunted resistance sections in parallel before shunting another section. Thus, most of the resistor is used most of the time, and I am able to provide a greater number of notches with a fewer number of resistance sections and a fewer number of contactors.

In notch 1, a contactor 107 is momentarily closed to re-energize the circuit controller KC in preparation for acceleration. When the circuit controller KC runs to the "off" position, a contactor 121 is closed to open the normally closed relay contacts 121' to prevent further operation of the controller motors in the deceleration direction.

Interlocking

In order that the same controller contactors may effectively and simply provide acceleration while operating in one direction, coasting and dynamic braking while operating in the opposite direction, it is necessary to disconnect certain of them during acceleration which operate during dynamic braking. Also, for proper shunting in deceleration, it is essential to rearrange the circuit during coasting and during dynamic braking to prevent operation of a portion of the contactors which normally operate during the acceleration cycle.

For instance, dynamic braking is accomplished by driving the traction motors as generators from the wheels being rotated by the vehicle which is moving over the rail. Being driven as generators, they provide a current to be dissipated in the dynamic braking load resistors 23, 24 and 25. In order to prevent excessive transient currents, it is essential that the control system provide an interlocking arrangement to disconnect the motor circuit from the power supply line terminal 21 by the opening of the relay or overcurrent switch 28. Thus, it is essential that the contactor 73 (FIG. 8) be in the circuit during acceleration and out of the circuit during dynamic braking or coasting. This is accomplished by the selector switch 46. Also, during the transition from power to coasting or dynamic braking, I prefer that the motor circuit be disconnected from the power supply before the safety switch 29 be closed. In order to insure this operation, a series contact 53 prevents closing of the contactor 29 until the contactor 28 is opened.

During dynamic braking, it is essential that the circuit controller KC be energized to run from position 14 to position 2. Also, once the selector control 45 is moved to the coasting or dynamic braking position, it is essential that the resistance controller KR can move through its entire cycle without re-energizing the circuit controller KC. Therefore, the contactors 75 and 95 are energized only from the acceleration contact 47 and the contactors 77 and 107 are energized only from contact 49 during deceleration.

Of course, it is obvious that a portion of the interlocking arrangement is provided by the operation of the circuit controller KC. For instance, in notches 8 through 14, the circuit controller selectively closes contactors 61, 62, 64, 65, 79 and 80 (FIG. 1) to provide acceleration connections according to my invention. The deceleration contactors 60, 61, 62, 63 and 66 are selectively closed in notches 1 through 7. It is obvious that dynamic braking should not be applied unless the interlocking contactor 63 is closed by the circuit controller KC to connect the motor circuit to the contactors 99 and 100 which control the shunting of the sections G, H, I, J, K, L and M of the main dynamic braking load resistor 25.

Similarly, during acceleration, contactors 88 and 89 control the shunting of the resistors 23 and 24, while during deceleration contacts 96 and 97 control this function.

If it is desired to match this new equipment to older, slower equipment, it may be desirable to place in the system an interlock contactor 120″ (FIG. 8) energizable in notch 10 of the circuit controller to prevent further acceleration notching of the circuit controller KC. In this way, the new equipment will not attempt to travel at 80 miles per hour while the old equipment is traveling at 40 miles per hour. However, it would be desirable also to energize a contactor 73″ to have the controller KR continue to notch 29 (see curve OEG, FIG. 9), to allow a full braking cycle. In order to provide this adjustment, I have provided a manual speed interlock switch 122 (FIG. 8) which will connect the contactors 120″ and 73″ to the power supply. It may, of course, be desirable to stop the controllers in other positions by other similar speed interlocks.

Similarly, it may be desirable to provide two or more rates of acceleration or braking. When operating this equipment in a train having slow speed cars, it will usually be desirable to accelerate at a slower rate. I prefer to provide the multiple rates of acceleration and braking by having separate contacts 47′ and 49′ energized by a selector switch 46′ to recalibrate the calibration relay 43. This will cause a current less than the maximum current to stop the controllers. Any well known means, such as the energization of a portion of the recalibration coil 54 by closing a contact 111 (FIGS. 1 and 8), will recalibrate the relay 43. Of course, it would be feasible to provide several acceleration or deceleration rates with my invention by merely recalibrating the calibration relay to desired sensitivities.

*Positioning*

Figure 6:
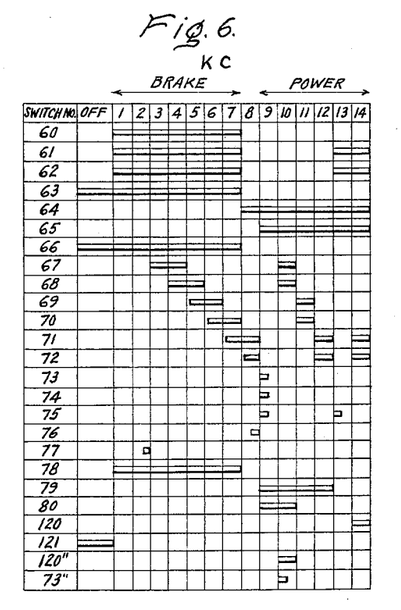
FIG. 6 is a schematic layout of the circuit controller.

In my invention, positioning is provided by the sequential operation of the controllers, particularly the resistance controller KR, in a manner which will allow the application of power or coasting or dynamic braking from any speed of the vehicle or position of the controller. By "positioning" I mean the operation of the various controller switches to allow the relative position in relation to speed as shown in FIG. 9. The means for providing this, while using all of the acceleration load resistors during dynamic braking, include both the special circuit arrangement and the contactor sequence arrangement of the controllers disclosed. The circuit arrangements and the operation of the controllers is fully described above and the controller positioning is shown in FIGS. 6 and 7. It will be obvious to one skilled in the art that the shunting arrangement for removing proper amounts from the resistor 25 during both acceleration and deceleration will require a lengthy calculation, dealing with several variables, including the motor characteristics, the gear ratio, the maximum speed, inertia, etc.

Normally in acceleration, the load resistors are shunted from the circuit as the controller KR is driven toward notch 29 with the voltage across the resistors decreasing in each step but the transition step. In my invention, I am able to do this as follows: in the acceleration steps 1–12, the voltage across the resistors is nearly 600 volts dropping to zero in notch 24, the voltage is approximately 200 volts across each of the resistors 23 and 24 in notch 24 dropping to zero volts in notch 27. However, for dynamic braking, the voltage pattern across the load resistors is just the reverse and may be as much as 1750 volts in notch 29, dropping to zero in notch 1.

In order to clearly explain the positioning arrangement, I have shown a graph (FIG. 9) of the speed of the train on the abscissa and the resistance controller KR position on the ordinate scale. For proper positioning of the controller KR, the acceleration positions should be above the deceleration positions.

It is essential to my invention that dynamic braking be available in the low speed notches as well as the high speed notches. By connecting the main dynamic braking resistor sections G, H, I, J, K, L and M through the interlocking arrangement to be effective only in steps 1–22 of dynamic braking, I am able to provide both the normal shunting arrangement and the desired positioning.

The maximum acceleration rate, curve OA, is at all times substantially above the maximum braking line BC. This means that the controller KR can be adapted to be operated in only one direction during acceleration and in only the opposite direction during deceleration so that it will always run to a lower braking notch than is used during acceleration at the same speed. Also, if the train is operated at maximum acceleration, curve OA, it is readily apparent it can easily go down to minimum braking, curve B′D, by merely changing the position of the selector switch 46 and allowing the controller KR to run down a few notches to the desired position. Similarly, the minimum acceleration positioning, curve OE, although substantially below the maximum acceleration rate, is above the minimum deceleration curve B′D, and the maximum braking line BC.

This arrangement is accomplished by careful selection of the resistance shunting arrangement and by allowing the controller KR to run through position 18 before it closes any contactors removing resistance from the lower portion of the deceleration cycle. Actually, with my invention, none of the braking resistance is removed during the acceleration cycle until the vehicle is traveling 6 miles per hour. For a minimum braking to be called for at this particular speed, the resistance controller KR would have to notch back from 18 to 13. For maximum braking, the cam controller KR would notch down to notch 10. Similarly, if the selector switch 46 were connected for maximum acceleration, the controller KR in notch 25, the train would be going approximately 20 miles per hour. If minimum dynamic braking were desired, the resistance controller KR would be required to notch only to position 21. For maximum braking, the controller would notch to position 19.

A study of the resistance controller position of minimum and maximum braking rates with motors at full field shows that the braking will be applied between any maximum speed and one and one-half miles per hour. Thus, with minimum braking, if a train is going at any speed between 100 and 40 miles per hour, the resistance controller will stay in notch 29 while the circuit controller closes contactors to adjust the traction motor field strength to maximum. FIG. 9 shows that the resistance controller KR must be in notch 29 to reach speeds greater than 35 miles per hour. During the braking cycle the calibration relay 43 will be de-energized to start the controller KR at various minimum speeds, and the controller KR will operate to move intermittently through notches 28, 27, 26, 25, 24, etc., until the train is slowed to one and one-half miles per hour, or about 2 percent of the maximum speed of the traction motors. At lower speeds, the traction motors will not provide sufficient dynamic braking and auxiliary brakes should be provided as disclosed in my co-pending application Serial Number 594,881, filed June 29, 1956, now Patent No. 2,926,759, and assigned to the assignee of this application.

The coasting notching, shown as the dotted line HI, should lie between the minimum braking line and the minimum acceleration line. This is accomplished by the proper recalibration of the relay 43 and shunting of the traction motor field windings during coasting.

It will be noted that in acceleration or deceleration, the time duration of each step will vary slightly from that in an adjacent step depending on the motor characteristics and the relative size of the section of resistance shunted. Ideally, the traction motor currents and the actual time in each notch should be equal, with the loading of the vehicle controlling its duration.

The notch 24 is the transition acceleration KR notch where the circuit controller KC runs through series field shunting steps. The curve B'EG shows the effect of closing the speed limit switch 122.

While I have shown and described particular embodiments of my invention, modifications thereof will occur to those skilled in the art. For instance, the number of resistor sections or notches may be varied depending on the motor characteristics and the various components available, or it may be desirable to provide other interlocking functions to allow the operation of this equipment on track having peculiar speed restrictions. Also, in some applications of my invention, it may be preferable because of traction motor characteristics or resistor sections available to design the minimum braking curve B'D to be equal to or above the minimum acceleration curve OEF during a few of the notches. I desire it to be understood, therefore, that I intend by the appended claims to cover all modifications within the true spirit and scope of my invention.

What I claim as new and desire to secure by Letters Patent of the United States is:

1. A control positioning system for a traction motor comprising a current limiting resistor having a plurality of sections connectable in circuit with the motor, a controller operable in one direction during acceleration and in only the opposite direction during deceleration, first means for connecting a portion of said resistor in circuit with the motor during acceleration, first contactor means in circuit with said resistor portion and operable by said controller to selectively shunt said sections of said resistor portion from the motor circuit during acceleration, second means for connecting the remainder of said resistor in circuit with the motor during deceleration, and second contactor means in circuit with said remainder and operable by said controller to selectively shunt sections of said remainder from the motor circuit during deceleration only, whereby the operation of said second contacting means affects only the deceleration currents of the motor.

2. A control positioning system for a traction motor comprising a current limiting resistor having a plurality of sections connectable in circuit with the motor, a controller operable in one direction during acceleration and in only the opposite direction during deceleration, first means for connecting a portion of said resistor in circuit with the motor during acceleration, first contactor means in circuit with said resistor portion and operable by said controller to selectively shunt sections of said resistor portion from the motor circuit during acceleration, second means for connecting the remainder of said resistor in circuit with the motor during deceleration, second contactor means in circuit with said remainder and operable by said controller to selectively shunt sections of said remainder from the motor circuit during deceleration only, whereby the operation of said second contacting means affects only the deceleration currents of the motor, motor current sensing means connected in circuit with the motor to prevent operation of said controller when the motor current exceeds a predetermined value, said controller having a contactor closing arrangement operable upon switching from acceleration to deceleration to connect in the motor circuit a number of resistor sections sufficient to limit the current to a value insufficient to energize said sensing means.

3. A control positioning system for a traction motor comprising a controller having a predetermined number of contactor closing positions intermittently operable in one direction during acceleration and in only the opposite direction during deceleration, a current limiting resistor having a plurality of resistance sections connectable in circuit with the motor, first means for connecting a portion of said resistor in circuit with the motor during acceleration, first contactor means in circuit with said resistor portion and operable by said controller to selectively shunt sections of said resistor portion from the motor circuit during acceleration, second means for connecting the remainder of said resistor in circuit with the motor during deceleration, second contactor means in circuit with said remainder and operable by said controller to selectively shunt sections of said remainder from the motor circuit during deceleration only, and means operable upon switching between acceleration and deceleration for changing the position of said controller to provide a desired motor current.

4. A control positioning system for a traction motor comprising a controller having a predetermined number of contactor closing positions intermittently operable in one direction during acceleration and only in the opposite direction during deceleration, a current limiting resistor having a plurality of sections connectable in circuit with the motor, first means for connecting a portion of said resistor in circuit with the motor during acceleration, first contactor means in circuit with said resistor portion and operable by said controller to selectively shunt sections of said resistor portion from the motor circuit during acceleration, second means for connecting the remainder of said resistor in circuit with the motor during deceleration, second contactor means in circuit with said remainder and operable by said controller to selectively shunt sections of said remainder from the motor circuit during deceleration, motor current sensing means connected in circuit with the motor to prevent operation of said controller when the motor current exceeds a predetermined value, and means operable upon switching from acceleration to deceleration for changing the position of said controller to selectively shunt sections of said remainder from the motor circuit until said sensing means is energized.

5. A control positioning system for accelerating and decelerating a traction motor comprising a current limiting resistor having a plurality of sections, first means for connecting a portion of said resistor in circuit with the motor during acceleration, second means for connecting said portion in circuit with the motor during deceleration only, third means for connecting the remainder of said resistor in the motor circuit only during deceleration, a controller operable in one direction during acceleration and in only the opposite direction during deceleration, first contactor means in circuit with said first and second means and operable by said controller to selectively shunt sections of said resistor portion from the motor circuit in a first predetermined manner during acceleration, said first contactor means operable by said controller to selectively shunt sections of said resistor portion from the motor circuit in a second predetermined manner during deceleration, and second contactor means connected in circuit with said third means and operable by said controller to selectively shunt sections of said remainder from the motor circuit during deceleration.

6. A control positioning system for accelerating and decelerating a traction motor comprising a current limiting resistor having a plurality of sections, first means for connecting a portion of said resistor in circuit with the motor during acceleration, second means for connecting said portion in circuit with the motor during deceleration only, third means for connecting the remainder of said resistor in the motor circuit only during deceleration, a controller operable in one direction during acceleration and in only the opposite direction during deceleration, first contactor means in circuit with said resistor portion and operable by said controller to selectively shunt sections of said resistor portion from the motor circuit in a first predetermined manner during acceleration, said first contactor means operable by said controller to selectively shunt sections of said resistor portion from the motor circuit in a second predetermined manner during deceleration, second contactor means in circuit with said remainder and operable by said controller to selectively shunt sections of said remainder from the motor circuit during deceleration, motor current sensing means connected in circuit with the motor to prevent operation of said controller when the motor current exceeds a predetermined value, said controller having a contactor closing arrangement operable when switching from acceleration to deceleration for connecting in the motor circuit a number of resistor sections sufficient to limit the current to a value insufficient to energize said sensing means.

7. A control positioning system for accelerating and decelerating a traction motor comprising a current limiting resistor having a plurality of sections, first means for connecting a portion of said resistor in circuit with the motor during acceleration, second means for connecting said resistor portion in circuit with the motor during deceleration, third means for connecting the remainder of said resistor in the motor circuit only during deceleration, a controller having a predetermined number of contactor closing positions operable in one direction during acceleration and in only the opposite direction during deceleration, first contactor means connected in circuit with said first and second means and operable by said controller to selectively shunt sections of said resistor portion from the motor circuit in a first predetermined manner during acceleration, said first contactor means operable by said controller to selectively shunt sections of said resistor portion from the motor circuit in a second predetermined manner during deceleration, second contactor means connected in circuit with said third means and operable by said controller to selectively shunt sections of said remainder from the motor circuit during deceleration, and means operable upon switching from acceleration to deceleration for changing the portion of said controller to provide a desired deceleration current.

8. A dynamic braking control system for a traction motor, comprising a current limiting resistor having a plurality of resistance sections, first means for connecting a portion of said resistor in circuit with the motor during acceleration, second means for connecting the remainder of said resistor in circuit with the motor during dynamic braking, a controller having a predetermined number of contactor closing operating positions, said controller operable in one direction during acceleration and in only the opposite direction during deceleration, contactor means in circuit with said remainder and operable by said controller to selectively shunt resistance sections of said remainder from the motor circuit during deceleration, motor current sensing means for preventing operation of said controller when the motor current exceeds a predetermined value, and means operable upon switching from acceleration to dynamic braking to operate said controller through said operating positions to provide a substantially constant braking current throughout the operating positions of said controller.

9. A dynamic braking control system for a traction motor, comprising a current limiting resistor having a plurality of resistance sections, first means for connecting a portion of said resistor in circuit with the motor during acceleration, second means for connecting the remainder of said resistor in circuit with the motor during dynamic braking, a controller having a predetermined number of contactor closing operating positions, said controller operable in one direction during acceleration and in only the opposite direction during deceleration, contactor means in circuit with said remainder and operable by said controller to selectively shunt resistance sections of said remainder from the motor circuit during deceleration, motor current sensing means for preventing operation of said controller when the motor current exceeds a predetermined value, means operable upon switching from acceleration to dynamic braking to operate said controller through said operating positions to provide a substantially constant braking current throughout the operating positions of said controller, and means to reverse the direction of operation of said controller when in any position.

References Cited in the file of this patent

UNITED STATES PATENTS

| | | |
|---|---|---|
| 2,265,706 | Tritle | Dec. 9, 1941 |
| 2,310,050 | Austin | Feb. 2, 1943 |
| 2,566,898 | Lichtenfels et al. | Sept. 4, 1951 |